(12) United States Patent
McGregor

(10) Patent No.: US 8,106,659 B2
(45) Date of Patent: Jan. 31, 2012

(54) IN SITU MEASUREMENTS IN FORMATION TESTING TO DETERMINE TRUE FORMATION RESISTIVITY

(75) Inventor: M. Douglas McGregor, The Woodlands, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 753 days.

(21) Appl. No.: 12/180,029

(22) Filed: Jul. 25, 2008

(65) Prior Publication Data
US 2010/0018304 A1    Jan. 28, 2010

(51) Int. Cl.
G01V 3/18       (2006.01)
E21B 49/10      (2006.01)

(52) U.S. Cl. .................... 324/325; 73/152.24
(58) Field of Classification Search ............... 73/152.24, 73/152.26; 324/324, 325, 351, 355, 374
See application file for complete search history.

(56) References Cited

U.S. PATENT DOCUMENTS

| | | | |
|---|---|---|---|
| 2,782,364 A * | 2/1957 | Shuler, Jr. et al. ............ 324/366 |
| 3,028,542 A * | 4/1962 | Terry ............................ 324/347 |
| 3,060,373 A * | 10/1962 | Doll ............................. 324/374 |
| 3,116,449 A | 12/1963 | Vogel |
| 3,397,356 A * | 8/1968 | Dumanoir ..................... 324/352 |
| 3,579,098 A * | 5/1971 | Mougne ........................ 324/375 |
| 4,015,197 A * | 3/1977 | Clavier ......................... 324/374 |
| 4,019,125 A * | 4/1977 | Daniel .......................... 324/374 |
| 4,087,739 A * | 5/1978 | Vieiro ........................... 324/374 |
| 4,335,353 A | 6/1982 | Lacour-Gayet |
| 4,369,497 A * | 1/1983 | Poupon et al. ..................... 702/8 |
| 4,427,944 A * | 1/1984 | Chandler ....................... 324/353 |
| 4,495,604 A * | 1/1985 | Clavier et al. ................... 367/25 |
| 4,502,121 A * | 2/1985 | Clavier et al. ................... 702/13 |
| 5,008,625 A * | 4/1991 | Chen ............................ 324/351 |
| 5,038,108 A | 8/1991 | Lessi et al. |
| 5,162,740 A * | 11/1992 | Jewell ........................... 324/347 |
| 6,301,959 B1 | 10/2001 | Hrametz |
| 7,178,591 B2 * | 2/2007 | Del Campo et al. .......... 166/264 |
| 7,703,317 B2 * | 4/2010 | Goodwin et al. .......... 73/152.24 |

(Continued)

FOREIGN PATENT DOCUMENTS
WO       02/075364 A1     9/2002

OTHER PUBLICATIONS

U.S. Appl. No. 11/626,461, filed Jan. 24, 2007, Kasperski.

(Continued)

*Primary Examiner* — John Fitzgerald
(74) *Attorney, Agent, or Firm* — Wong, Cabello, Lutsch, Rutherford & Brucculeri, L.L.P.

(57) ABSTRACT

A borehole formation testing system that measures resistivity of near borehole formation in situ rather than the measuring resistivity of fluid drawn into a formation tester tool. A radially extendable probe assembly contacts and forms a hydraulic seal with the wall of a borehole using a pad. Electrode contacts are disposed on the contact surface of the pad and electrically contact the near borehole formation. Response of the electrode contacts are used to determine resistivity of the near borehole formation. This resistivity is with a deeper formation resistivity measurement to determine if virgin formation fluid is at or in the vicinity of the pad. Alternately, a plurality of resistivity measurements is made at the formation tester pad and virgin formation fluid at or near the pad is determined from the rate of change of the plurality of resistivity measurements.

20 Claims, 3 Drawing Sheets

U.S. PATENT DOCUMENTS

| | | | |
|---|---|---|---|
| 7,845,219 B2 * | 12/2010 | Goodwin et al. | 73/152.24 |
| 7,878,243 B2 * | 2/2011 | Goodwin et al. | 166/264 |
| 2007/0039731 A1 * | 2/2007 | Fox et al. | 166/264 |
| 2007/0151724 A1 * | 7/2007 | Ohmer et al. | 166/187 |
| 2009/0008079 A1 * | 1/2009 | Zazovsky et al. | 166/60 |

OTHER PUBLICATIONS

Examination Report from UK patent application No. GB0909748.6 dated Aug. 13, 2010.

International Search and Examination Report from UK patent application No. 0909748.6 dated Sep. 18, 2009.

* cited by examiner

IN SITU MEASUREMENTS IN FORMATION TESTING TO DETERMINE TRUE FORMATION RESISTIVITY

FIELD OF THE INVENTION

This invention is related to borehole formation testing and the measure of resistivity of formation. More particularly, the invention is related to the measure of resistivity of formation contacted by a formation tester pad and comparison of this measure with a deeper formation resistivity measurement to determine if virgin formation fluid is at or in the vicinity of the formation tester tool pad fluid port. Alternately, a plurality of resistivity measurements is made at the formation tester pad and virgin formation fluid at or in the vicinity of the formation tester tool pad is determined from the rate of change of the plurality of measurements.

BACKGROUND

A variety of systems are used in borehole geophysical exploration and production operations to determine chemical and physical parameters of materials in the borehole environs. The borehole environs include materials, such as fluids or formation matrix, in the vicinity of a borehole as well as materials, such as fluids, within the borehole. The various systems include, but are not limited to, formation testers and borehole fluid analysis systems conveyed within the borehole. In all of these systems, it is preferred to make all measurements in real-time and within instrumentation in the borehole. However, methods that collect data and fluids for later retrieval and processing are not precluded.

Formation tester systems are used in the oil and gas industry primarily to measure pressure and other reservoir parameters, such as permeability, of a formation penetrated by a borehole. Formation tester systems are also used to collect and analyze fluids drawn or flowed from the borehole environs and into a formation tester borehole instrument or "tool" to determine major constituents within the fluid. These parametric measurements are preferably made within the tool but can be combined with addition "in situ" or uphole analyses of physical and chemical properties of the formation fluid to evaluate hydrocarbon production prospects of a reservoir penetrated by the borehole. By definition, formation fluid refers to any and all fluid including any mixture drilling fluid and virgin formation fluids.

Regarding formation fluid sampling, it is of prime importance that fluid collected for analysis represents virgin formation fluid with little contamination from fluids used in the borehole drilling operation. Various techniques have been used to measure sample contamination including the monitoring of fluid pumped into the formation tester tool until one and/or more fluid properties, such as resistivity, cease to change as a function of time. These analyses are made within the formation tester tool in real time. Other techniques use multiple fluid input ports combined with borehole isolation elements such as packers and pad probes to minimize fluid contamination. Again, all fluid analyses are made within the formation tester tool or subsequently made at the surface of the earth.

Formation tester tools can be conveyed along the borehole by variety of means including, but not limited too, a single or multi-conductor wireline, a "slick" line, a drill string, a permanent completion string, or a string of coiled tubing. Formation tester tools may be designed for wireline usage or as part of a drill string. Tool response data and information as well as tool operational data can be transferred to and from the surface of the earth using wireline, coiled tubing and drill string telemetry systems. Alternately, tool response data and information can be stored in memory within the tool for subsequent retrieval at the surface of the earth.

Various methods are used to draw fluid into the formation tester tool for pressure measurements, analysis, sampling, and optionally for subsequent exhausting the fluid into the borehole. One method employs a radially extendable sampling pad that is pressed against the wall of the borehole. A pad fluid port or "snorkel" may or may not be extended from the center of the pad and through any borehole mud cake to make contact with formation material. Fluid is drawn into the formation tester tool via a flow line cooperating with the pad fluid port. Fluid properties are then measured within the formation tester and subsequently ejected back into the borehole or retained in one or more sample carrier chambers in the tester tool for return to the surface for subsequent analysis. A more detailed description of formation tester methodology is presented in U.S. Pat. No. 6,301,959 B1 and U.S. patent application Ser. No. 11/626,461 filed Jan. 24, 2007, both of which are here entered into this disclosure by reference.

SUMMARY OF THE INVENTION

This disclosure is directed toward to borehole formation testing apparatus and methods for making in situ formation measurements to determine formation fluid properties near a borehole. This offers advantages over prior art systems that determine formation fluid properties only after fluid has been drawn into the formation tester tool.

As discussed previously, formation tester tools typically employ a pad type device that is pressed against the wall of a borehole. Fluid is drawn into the tool through a probe traversing the pad as described in the disclosures previously entered into this disclosure by reference. The pad is typically a malleable material that can conform to and provide a hydraulic seal when extended or "seated" against the borehole wall.

The face of the pad comprises preferably a plurality of electrodes that are disposed in an azimuthal and radial pattern. The electrodes, which will be embodied as "resistivity" buttons on this disclosure, electrically contact the borehole wall and cooperate with electronics within the formation tester tool to yield in situ measurements of "pad" resistivity at or in the immediate vicinity of the formation wall. These pad resistivity measurements can then be compared with an independent, radially deep investigating resistivity measurement, such a laterolog or induction log, to determine whether or not original or "virgin" formation fluid has perturbed by drilling fluid or drilling fluid filtrate. If the pad resistivity measured at the borehole wall and the corresponding "deep" resistivity measurements differ significantly, this is a typical indication that drilling fluid or drilling fluid filtrate are present in the immediate borehole vicinity. Any fluid drawn through the pad probe into the formation tester tool would, therefore, be contaminated and not represent virgin formation fluid. Contaminated fluid would typically be ejected into the borehole via a tool exhaust port as described in previously entered referenced U.S. patent application Ser. No. 11/626,461. If the pad and deep resistivity measurements are essentially the same, any fluid drawn through the probe and into the formation tester tool will represent essentially virgin formation fluid. This fluid would typically be diverted to a sample chamber within the tool and subsequently returned to the surface for analysis. Additional fluid analyses can be performed within the formation tester tool.

An alternate method for determining if virgin formation fluid is being drawn comprises seating the pad against the borehole wall, drawing fluid through the pad fluid port, and making a plurality of pad resistivity measurements at different times during the drawing process. If resistivity varies as a function of time, this typically indicates that the fluid is contaminated. Contaminated fluid is returned to the borehole through the exhaust port. If resistivity ceases to change as a function of time, this typically indicates that the "most" virgin formation fluid obtainable is being drawn into the tool, or the least contaminated fluid is being drawn and can be diverted to a sample chamber within the formation tester tool.

Comparison of resistivity measurements between the pad and other resistivity devices is not limited to the other resistivity devices being on the same tool. The comparison resistivity measurement that the pad is trying to match could be provided from other sources then just another resistivity measurement made at the same time. The desired formation resistivity value can obtained from measurement made earlier in the drilling of the well, or could obtained from a nearby well and sent from the surface to the tool, or could be pre-stored in the tool prior to entering the wellbore, if this information is already known and once the desired pad resistivity is met, the fluid can be diverted to a sample chamber, or to other fluid property measuring devices in the tool. A key feature of this pad resistivity measurement is the time savings that would be realized from not having to transmit the information to the surface, do the comparison and then transmit new commands to the tool to divert the fluid flow coming from the formation. By enabling the tool to make the decision on its own, significant rig time can be saved.

Other types of measurements can be made as the fluid is being drawn. The buttons can be replaced by concentric rings centered around the pad probe.

BRIEF DESCRIPTION OF THE DRAWINGS

The manner in which the above recited features and advantages, briefly summarized above, are obtained can be understood in detail by reference to the embodiments illustrated in the appended drawings.

DETAILED DESCRIPTION OF THE PREFERRED EMBODIMENTS

Basic principles of the of the borehole formation testing apparatus and methods for making formation in-situ measurements are disclosed in detail using an exemplary system embodied to measure resistivity.

Figure 1:
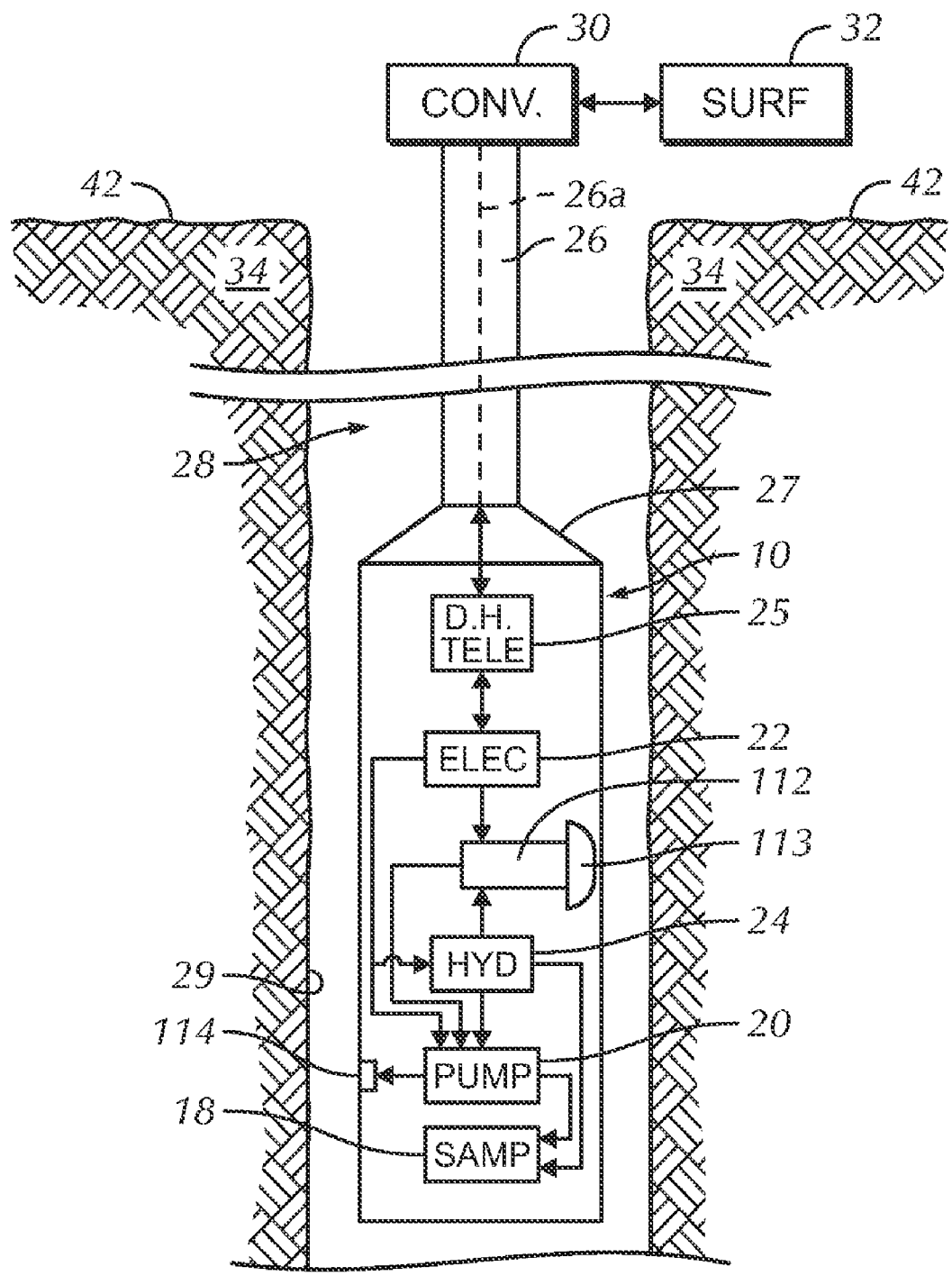
FIG. 1 illustrates conceptually the major elements of a formation tester system operating in a well borehole that penetrates earth formation.

FIG. 1 illustrates conceptually the major elements of a formation tester system operating in a well borehole 28 that penetrates earth formation 34. The formation tester tool is denoted as a whole by the numeral 10. The tool 10 comprises probe assembly radially extendable from the tool 10 and a probe assembly comprising a probe structure 112 terminated by a pad 113, at least one sample carrier 18, a pump 20, hydraulics 24 to extend and retract the pad assembly and to operate valves within the formation tester, an electronics section 22, and a downhole telemetry element 25. Details of the radially extendable probe assembly comprising a probe structure 112 terminated by a pad 113 are disclosed in previously referenced U.S. Pat. No. 6,301,959 B1 and U.S. patent application Ser. No. 11/626,461.

The electronics section 22 shown in FIG. 1 comprises necessary tool control to operate elements (not shown) of the tool 10, including power supplies for the various electronic elements of the tool, power electronics, optional memory for data storage downhole, and a tool processor for control, measurement, and communication to and from the tool.

Still referring to FIG. 1, the tool 10 can have an optional downhole telemetry section 25 for transmitting various data measured within the tool 10 and for receiving commands from surface 42 of the earth. The downhole telemetry section 25 can also receive commands transmitted from the surface of the earth or the information can be stored in memory. The upper end of the tool 10 is terminated by a connector 27. The tool 10 is operationally connected to a conveyance apparatus 30 disposed at the surface 42 by means of a connecting structure 26 that is a tubular or a cable. More specifically, the lower or "borehole" end of the connecting structure 26 is operationally connected to the tool 10 through the connector 27. The upper or "surface" end of the connecting structure 26 is operationally connected to the conveyance apparatus 30. The connecting structure 26 can function as a data conduit between the tool 10 and equipment disposed at the surface 42.

The formation tester tool 10 shown conceptually in FIG. 1 is conveyed within a well borehole by any suitable conveyance apparatus. If the tool 10 is a logging tool element of a wireline formation tester system, the connecting structure 26 represents a preferably multi-conductor wireline logging cable and the conveyance apparatus 30 is a wireline draw works assembly comprising a winch. Alternately, a slick line can be used as a connecting structure 26 necessitating the storage of all measured data within downhole memory. If the tool 10 is a component of a measurement-while-drilling or logging-while-drilling system, the connecting structure 26 is a drill string and the conveyance apparatus 30 is a rotary drilling rig. If the tool 10 is an element of a coiled tubing logging system, the connecting structure 26 is coiled tubing and the conveyance apparatus 30 is a coiled tubing injector. If the tool 10 is an element of a drill string tester system, the connecting structure 26 is again a drill string and the conveyance apparatus 30 is again a rotary drilling rig. The broken line 26a represents two-way data communication between the tool and surface if borehole telemetry is used.

Again referring to FIG. 1, surface equipment 32 is operationally connected to the tool 10 through the conveyance apparatus 30 and the connecting structure 26. The surface equipment 32 comprises a surface telemetry element (not shown), which communicates with the downhole telemetry section 25. The connecting structure 26 functions as a data conduit between the downhole and surface telemetry elements. The surface unit 32 preferably comprises a surface processor that optionally performs additional processing of data measured by sensors and gauges in the tool 10. The surface processor also cooperates with a depth measure device (not shown) to track data measured by the tool 10 as a function of depth within the borehole at which it is measured. The surface equipment 32 preferably comprises recording means for recording "logs" of one or more parameters of interest as a function of time and/or depth.

During the borehole drilling operation, the fluid within near borehole formation 34 can be contaminated with drilling fluid typically comprising solids, fluids, and other materials. Liquid from the drilling fluid invades the virgin formation producing an invaded or "flushed" zone. Particulates in the drilling fluid typically accumulate on the borehole wall forming a "mud cake". Drilling fluid contamination of fluid drawn from the formation 34 is typically minimized using a probe structure 112 and pad 113 being seated against the wall 29 of the borehole 28. Methods for measuring contamination and determining that virgin formation fluid is being sampled will be discussed in detail in subsequent sections of this disclosure.

Figure 2A:
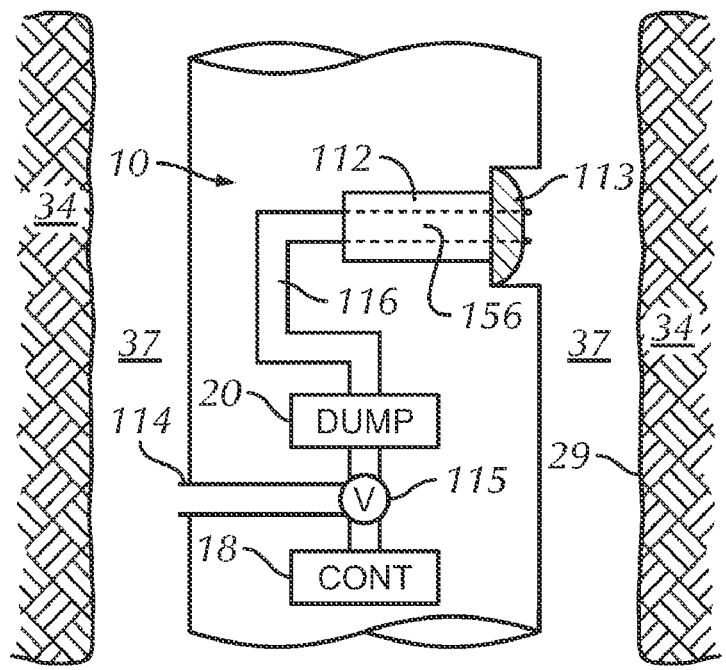
FIG. 2a is a more detailed conceptual illustration of elements comprising the formation tester tool with the probe structure and pad attached thereto retracted.

FIG. 2a is a more detailed conceptual illustration of element comprising the formation tester. More specifically, FIG. 2 is a side view of a portion of the logging tool 10, and formation tester elements therein, are suspended in the borehole 28 filled with a fluid which is typically drilling fluid or drilling "mud". The probe assembly comprising a probe structure 112 and pad 113 attached thereto are shown retracted within the outer radius of the tool 10. A pad fluid port 156 (preferably terminated at the pad contact surface by a snorkel, traverses the pad 113 and probe structure 112, and is connected to a pump 20 via a flow line 116. The pump 116 can be operated to either draw fluid through the port 156 and direct it into a sample chamber or exhaust it into the borehole through an exhaust port 114, depending upon the setting of a valve 115.

Figure 2B:
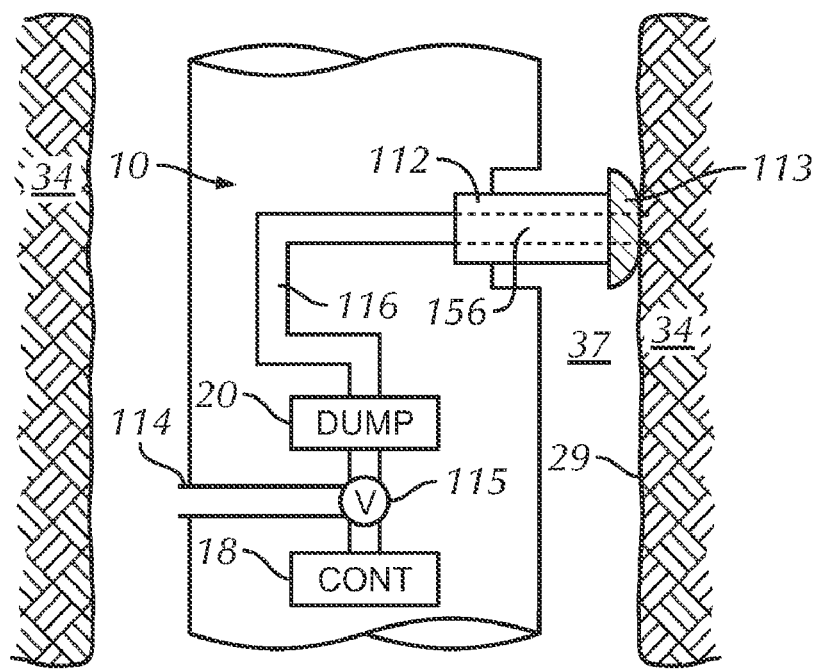
FIG. 2b is a conceptual illustration of the formation tester tool shown in FIG. 2a but with probe and pad structure extended thereby seating the pad against a borehole wall.

FIG. 2b is a side view similar to that shown in FIG. 2, but with the probe structure 112 extended so that a contact surface of the pad 113 forms a hydraulic seal with the formation 34 at the borehole wall 29.

Figure 3:
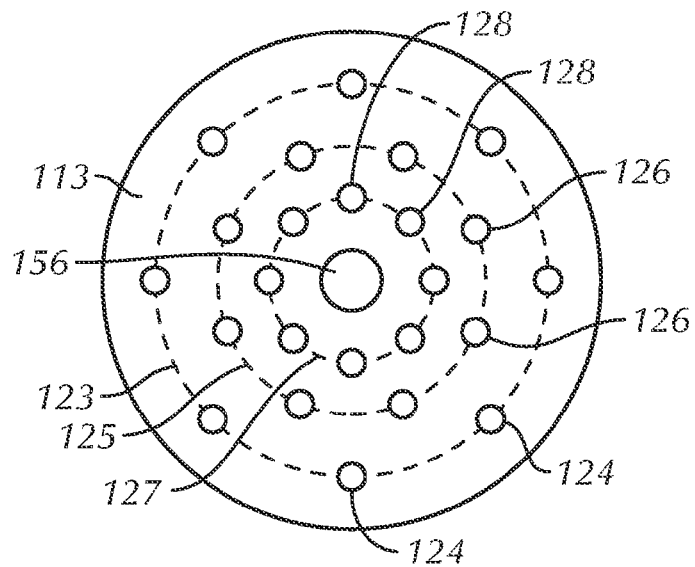
FIG. 3 is a front view of the pad illustrating the pad contact surface with a plurality of contact electrodes disposed thereon.

FIG. 3 is a front view of the pad 113 illustrates the pad contact surface. A cross section of the pad fluid port 156 is shown at the center. A plurality of electrode contacts or buttons is disposed over the contact surface of the pad 113. In the illustration of FIG. 3, the buttons are disposed on three concentric rings 123, 125, 127 centered around the pad fluid port 156. Eight buttons 122, 124 and 126 are disposed at equal azimuthal spacings around the concentric rings 123, 125 and 127, respectively. It is noted that FIG. 3 is used to conceptually illustrate the electrode depositions. The electrodes need not be disposed in a concentric ring pattern. The number of electrodes can be greater of smaller than the 24 illustrated in FIG. 3. The electrodes need not be disposed at a constant density over the pad surface. Finally, the electrodes need not be buttons, but can be fabricated in other geometries such as rings.

In the context of this disclosure, the term "near borehole environs" includes material that effects resistivity measurements made by the pad electrodes ("pad" resistivity measurement) including borehole fluid, mud cake, drilling fluid filtrate, virgin formation, and formation matrix. Resistivity measurements of the near borehole environment using responses of the pad electrodes will be hereafter be referred to as simply "resistivity measurements" for brevity. Further in the context of this disclosure, the term "formation testing" includes the steps of extending the pad out of the formation tester tool, seating of the pad against the borehole wall, flowing fluid into the formation tester, measuring resistivity of the near borehole environs while fluid is flowing or not flowing into the formation tester, and subsequent retraction of the pad back into the formation tester tool. It is again emphasized that resistivity of the near borehole environs can be made at any step of formation testing. It is not necessary to draw fluid into the formation tester (as in prior art devices) since resistivity is measured at the pad contact surface.

Figure 4:
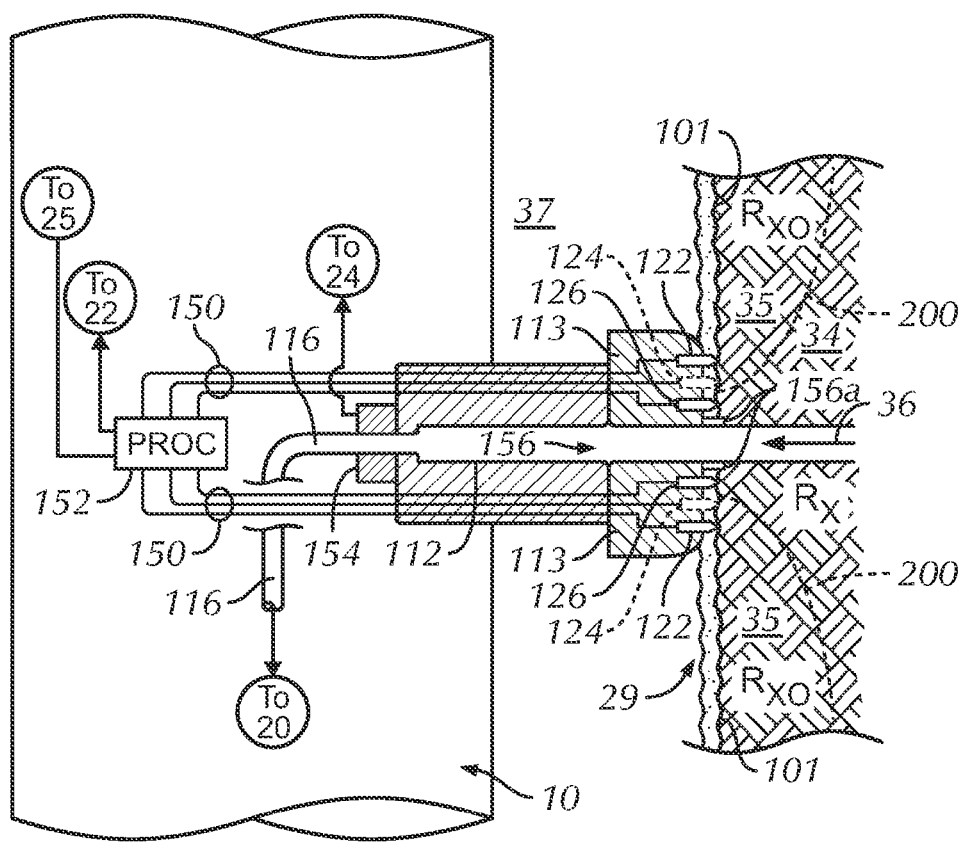
FIG. 4 illustrates a more detailed view of the probe structure and contact surface of the pad 13 seated against the borehole wall.

FIG. 4 illustrates a more detailed view of the probe structure 112 and contact surface of the pad 113 seated against the borehole wall 29. The tip of the pad fluid port uses a snorkel extension 156a to penetrate mud cake 101 on the borehole wall 29 and establish hydraulic communication between the pad fluid port 156 and the earth formation. The electrodes 122, 124 and 126 preferably have pointed tips to penetrate the mud cake 101 and establish an optimal electrical connection with the formation. Fluid is shown flowing into the formation tester through the pad fluid port 156 as illustrated conceptually by the arrow 36. Fluid flows through the flow line 116 to the pump 20 (see FIGS. 2a and 2b). The probe structure 112 is extended and retracted by a hydraulic motor 154 operationally connected to the hydraulics 24 (see FIG. 1). An electric motor can be used as an alternate means for moving the probe structure 112. Leads 150 electrically connect each electrode button to a tester processor 152. The tester processor 152 is operationally connected to the electronics 22 and downhole telemetry unit 25, both of which are shown in FIG. 1.

Resistivity can be computed using the response of any two pairs of electrodes yielding a "pad" resistivity measurement. Using the electrode array shown in FIG. 3 operating as a microlaterolog device, current flow at each electrode $I_{ij}$ can be measured, where i=1, 2, 3 and denotes the concentric ring on which the electrode is disposed, and j=1, 2, ..., 8 indicates a specific electrode on ring "i". Resistivity $R_{kl,mn}$ between any pair of electrodes "kl" and "mn" is then computed from the relationship $$R_{kl,mn}=F(I_{kl},I_{mn}) \quad (1)$$

Computations are preferably made in the tester processor 152 using predetermined relationships.

Attention is now directed to the right hand side of FIG. 4 which illustrates the near borehole environs. Uncontaminated or virgin formation is again denoted by the numeral 34. The resistivity of the virgin formation is defined as $R_t$. The invaded or flushed zone is denoted by the numeral 35 with a resistivity defined as $R_{xo}$. It is assumed that resistivities of the virgin fluid and the liquid phase of the drilling fluid are different. Again note that a snorkel structure 156a extends pad fluid port 156 sufficiently from the pad 113 to penetrate the mudcake 101. An interface between the invaded zone 35 and the virgin zone 34 is indicated by a broken line 200. As fluid flows into the pad probe 156, the interface 200 moves toward the pad probe as illustrated. It is noted that fluid can enter into the formation tester through the pad fluid port 156 by the action of the pump 20 or alternately by the action of an over-pressured formation 34.

Still referring to FIG. 4, the radial depth of investigation of a resistivity measurement is a function of the spacing between electrodes used to obtain the measurement. As the electrode spacing increases, the depth of investigation increases. As an example, resistivity determined using two outer ring electrodes 122 disposed at 180 degrees from each other will be "deeper" than a similar resistivity determination using two inner ring electrodes 126 disposed at 45 degrees from each other. By combining resistivities determined with pairs of electrodes values corresponding to different radial depth of investigation, a "map" of the interface 200 can be derived. Recalling that the objective of the formation test typically is to capture virgin formation fluid with minimal contamination from the flushed zone, the proximity of virgin fluid to the pad fluid port 156 can be determined without the necessity of measuring sampled fluid within the formation tester. Assume that virgin formation "deep" resistivity $R_t$ is measured independently with a deep investigating resistivity device, such as a laterolog, that is preferably conveyed simultaneously with the formation tester. Using equation (1), resistivity $R_{ij}$ measured across the pad fluid port 156 is compared with $R_t$. If $R_{ij}$ is not equal to $R_t$, fluid from the flushed zone $R_{xo}$ is being drawn, and this fluid is typically ejected into the borehole through the ejection port 114. If $R_{ij}$ is essentially equal to $R_t$, it is assumed that virgin formation fluid is being drawn and a sample of this fluid is typically diverted to a sample carrier 18. The previously described map of resistivity over the pad can be used to monitor progress of the movement of the interface 200 toward the pad fluid port 156. Such monitoring might indicate that borehole and/or formation conditions are such that a virgin fluid sample can not be obtained. Resistivity calculations and comparisons are preferably made using the tester processor 152.

In an alternate embodiment of the invention, the resistivity map is monitored as a function of time. More specifically, resistivity $R_{ij}$ across the pad fluid port 156 is measured as a function of time t. When $R_{ij}$ ceases to change as a function of time, it is assumed that virgin formation fluid or the least contaminated fluid is being drawn into the formation tested. Stated mathematically, $$Q=dR_{ij}/dt \quad (2)$$

If Q is not equal to zero, then the drawn fluid is not virgin. If Q is equal to zero, then the drawn fluid is assumed to be virgin fluid. The above computations and comparisons are again made in the tester processor 152 using predetermined relationships known in the art. No independent "deep" resistivity measurement $R_t$ is required. Note that equations (1) and (2) are predetermined relationships programmed into said tested processor 152.

Ideally we assume that if a pressure drop is created in the tool, then the fluid flow will come from the formation and will eventually clean up, or change from a flushed fluid to a clean reservoir fluid. There are situations that mud filtrate will flow easier through the formation rock then original reservoir fluid. In this situation, the fluid flow source can be determined by measuring the formation resistivity change from the outer electrode to the middle electrode and the formation resistivity change between the middle electrode and an inner electrode. By tracking and comparing the two resistivity measurements, you can ascertain if fluid being drawn into the tool is from the formation or if we are just flushing more mud filtrate through the formation. It is important to realize that pad resistivity is not just limited to measurements being made on opposite side of the pad and across the fluid intake. Also note that measurements can be made from one button to immediately surrounding buttons.

It is noted that the tool 10 does not necessarily have to be operated in or near the center of the borehole 28. In an alternate mode of operation, the entire 10 tool can be pressed against the borehole wall 29 by mechanical apparatus such as articulating arm (not shown) so that the probe remains within the tool and the pad 113 is pressed against the borehole wall.

The above disclosure is to be regarded as illustrative and not restrictive, and the invention is limited only by the claims that follow.

What is claimed is:

1. A borehole formation tester tool comprising:
   a probe assembly comprising a probe structure terminated by a pad and a pad fluid port traversing said probe structure;
   a plurality of electrodes disposed on a contact surface of said pad, wherein the electrodes are configured to measure resistivity of near borehole environs while the pad is seated against a wall of said borehole; and
   a tester processor configured to make one or more resistivity measurements using the probe and compare the one or more resistivity measurements with an independent deep resistivity measurement to detect a presence of virgin formation fluid at the pad fluid port.

2. The formation tester of claim 1 wherein the tester processor is further configured to:
   make a plurality of resistivity measurements of near borehole environs; and
   make a map of resistivity of the near borehole environs by combining said plurality of resistivity measurements using predetermined mathematical relations.

3. The formation tester of claim 1 wherein the tester processor is further configured to:
   make multiple resistivity measurements of the near borehole environs each at a different time; and
   detect the presence of virgin formation fluid at the pad port by detecting changes in the multiple resistivity measurements.

4. The formation tester of claim 1 further comprising:
   a valve; and
   a flow line hydraulically connecting said fluid pad port to said valve; wherein
   said valve hydraulically connects to a sample carrier or an exhaust port depending upon the setting of said valve.

5. The formation tester of claim 1 wherein said formation tester tool is adapted to be conveyed within the borehole with a wireline or a slick line or a drill string or a coiled tubing, or another conveyance system.

6. A method for formation testing comprising:
   disposing within a borehole a formation tester tool comprising a tester processor operably coupled to a probe assembly comprising a probe structure terminated by a pad having a plurality of electrodes on a contact surface of the pad, wherein a pad fluid port traverses the probe assembly with a first end terminating at the contact surface and a second end terminating within the formation tester tool;
   seating the contact surface against a wall of the borehole;
   taking one or more resistivity measurements of near borehole environs from a measure of response of said electrodes; and
   using the tester processor to compare resistivity of the near borehole environs with an independent deep resistivity measurement to detect the presence of virgin formation fluid at said first end of said pad fluid port.

7. The method of claim 6 further comprising:
   taking a plurality of the resistivity measurements of the near borehole environs;
   combining, in the tester processor, the plurality of resistivity measurements to form a map of resistivity of the near borehole environs; and
   detecting a presence of virgin formation fluid at the first end of the pad fluid port by using the map.

8. The method of claim 6 further comprising
   drawing fluid into the pad fluid port;
   measuring multiple resistivities of the near borehole environs each at a different time; and
   determining changes in the multiple resistivity measurements to detect the entrance of virgin formation fluid into the pad fluid port.

9. The method of claim 6 further comprising the step of measuring said resistivity while fluid is flowing within said pad fluid port.

10. The method of claim 6 further comprising the step of measuring said resistivity while fluid is not flowing within said pad fluid port.

11. The method of claim 6 further comprising:
hydraulically connecting the second end of the fluid pad port to a flow line terminating at a valve; wherein
the valve hydraulically connects to a sample carrier or an exhaust port depending upon the setting of the valve; and
the resistivity is computed in the tester processor from the electrode response using a predetermined relationship.

12. The method of claim 6 further comprising conveying said formation tester tool within said borehole with a wireline or a slick line or a drill string or a coiled tubing.

13. A borehole formation tester tool comprising:
a probe assembly comprising a probe structure terminated by a pad and a pad fluid port traversing said probe structure;
a plurality of electrodes disposed on a contact surface of said pad, wherein the electrodes are configured measure resistivity of near borehole environs while the pad is seated against a wall of said borehole; and
a tester processor configured to:
draw fluid into the pad fluid port;
measure multiple resistivities of the near borehole environs each at a different time; and
determining changes in the multiple resistivity measurements to detect the entrance of virgin formation fluid into the pad fluid port.

14. The borehole formation tester tool of claim 13 wherein the tester processor is further configured to make a map of resistivity of the near borehole environs by combining said plurality of resistivity measurements using predetermined mathematical relations.

15. The formation tester of claim 13 further comprising:
a valve; and
a flow line hydraulically connecting said fluid pad port to said valve; wherein
said valve hydraulically connects to a sample carrier or an exhaust port depending upon the setting of said valve.

16. The formation tester of claim 13 wherein said formation tester tool is adapted to be conveyed within the borehole with a wireline or a slick line or a drill string or a coiled tubing, or another conveyance system.

17. A method for formation testing comprising:
disposing within a borehole a formation tester tool comprising a tester processor operably coupled to a probe assembly comprising a probe structure terminated by a pad having a plurality of electrodes on a contact surface of the pad, wherein a pad fluid port traverses the probe assembly with a first end terminating at the contact surface and a second end terminating within the formation tester tool;
seating the contact surface against a wall of the borehole;
taking one or more resistivity measurements of near borehole environs from a measure of response of said electrodes; and
drawing fluid into the pad fluid port;
measuring multiple resistivities of the near borehole environs each at a different time; and
determining changes in the multiple resistivity measurements to detect the entrance of virgin formation fluid into the pad fluid port.

18. The method of claim 17 further comprising:
combining, in the tester processor, the plurality of resistivity measurements to form a map of resistivity of the near borehole environs; and
detecting a presence of virgin formation fluid at the first end of the pad fluid port by using the map.

19. The method of claim 17 further comprising:
hydraulically connecting the second end of the fluid pad port to a flow line terminating at a valve; wherein
the valve hydraulically connects to a sample carrier or an exhaust port depending upon the setting of the valve; and
the resistivities are computed in the tester processor from the electrode response using a predetermined relationship.

20. The method of claim 17 further comprising conveying said formation tester tool within said borehole with a wireline or a slick line or a drill string or a coiled tubing.

* * * * *